United States Patent [19]

Kumazaki et al.

[11] Patent Number: 4,680,758
[45] Date of Patent: Jul. 14, 1987

[54] SWITCHING SYSTEM HAVING TONE TRUNK

[75] Inventors: Masayuki Kumazaki, Yokohama; Toshio Shimoe, Kawasaki; Koso Murakami, Yokohama, all of Japan

[73] Assignee: Fujitsu Limited, Kawasaki, Japan

[21] Appl. No.: 845,587

[22] Filed: Mar. 28, 1986

[30] Foreign Application Priority Data

Mar. 30, 1985 [JP] Japan .................................. 60-64993

[51] Int. Cl.[4] .............................................. H04J 3/12
[52] U.S. Cl. ................................................ 370/110.2
[58] Field of Search ........................... 370/110.2, 68.1; 379/257

[56] References Cited

U.S. PATENT DOCUMENTS 4,171,466 10/1979 Carbrey ........................... 370/110.2
4,570,260 2/1986 Basehore ......................... 370/110.2

Primary Examiner—Thomas W. Brown
Attorney, Agent, or Firm—Staas & Halsey

[57] ABSTRACT

A switching system having a tone trunk which stores, in the digital memory thereof, a predetermined digital tone signal in the form of digital codes for supplying the corresponding analog tone signal to telephone sets of subscribers. The digital codes have been coded in such a way that the analog tone signal is accompanied by a quantizing noise having a characteristic of white noise.

8 Claims, 20 Drawing Figures

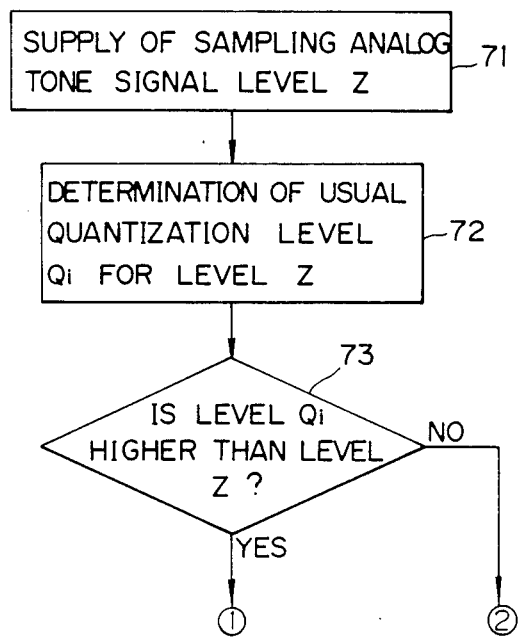

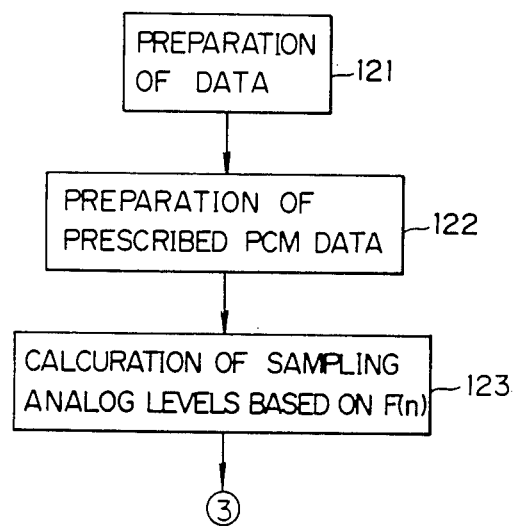

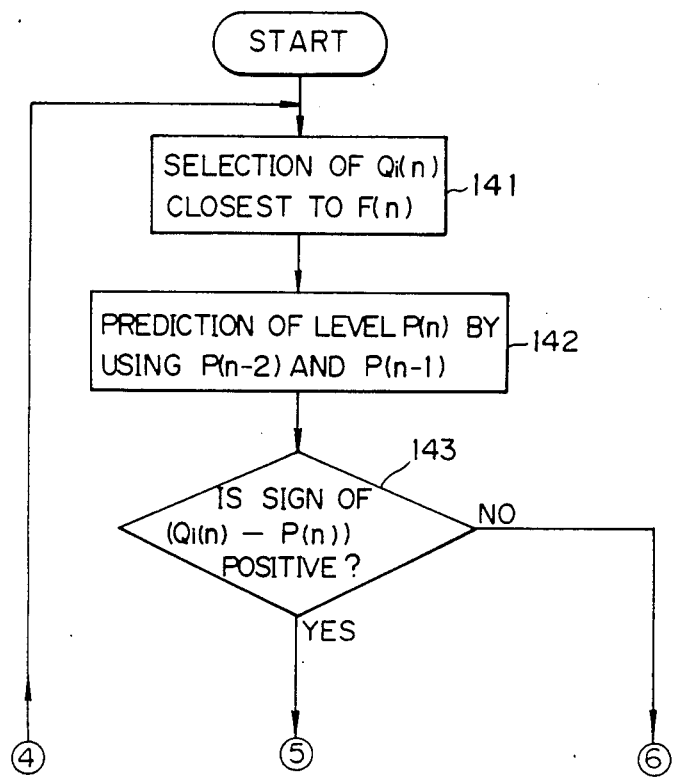

SWITCHING SYSTEM HAVING TONE TRUNK

BACKGROUND OF THE INVENTION

1. Field of the Invention

The present invention relates to a switching system, more particularly to a system including therein a tone trunk (TNT) which produces a variety of digital tone signals to be supplied, after conversion into analog tone signals, to subscriber's telephone sets.

2. Description of the Related Art

Generally, there are two methods of producing each tone signal from the tone trunk to the subscriber's telephone set. First, the tone trunk produces an analog tone signal and supplies it to the subscriber as is. Second, the tone trunk stores, in advance, a tone in the form of a digital signal, i.e., a digital tone signal, in its digital memory, and the digital tone signal is read therefrom. And then, when required, the digital tone signal supplied, after conversion into the corresponding analog tone signal, to the related subscriber. Of the above-mentioned two methods, the switching system of the present invention uses the tone signals produced as in the latter method, i.e., digitally processed tone signals.

The thus produced digital tone signals are supplied from the tone trunk to the subscribers in the form of a dial tone (DT), a ring-back tone (RBT), a busy tone (BT), a reorder tone (ROT), a hold tone (HT), and the like, selectively. These digital tone signals are stored in the digital memory of the tone trunk, such as a read-only memory (ROM).

Usually, each digital tone signal is obtained by first sampling a corresponding analog tone signal and then coding the thus-sampled analog tone signal with a predetermined coding rule, such as a known pulse code modulation (PCM) coding rule. In the usual PCM coding rule, each sampling analog tone signal level is quantized into a corresponding quantization level. Among the many different quantization levels, the quantization level is selected by determining a level which is closest to the sampling analog tone signal level.

It is commonly known that the thus-obtained digital tone signal is accompanied, when converted into the audible analog tone signal, by a quantizing noise, and from general experience, such a quantizing noise is inoffensive to the listener when the noise accompanies a random analog tone signal such as a voice signal.

The problem in the prior art switching system having the digital tone trunk is that the quantizing noise is offensive to the listener when the noise accompanies a monotonous tone such as the dial tone (DT), the ring-back tone (RBT) and the like. Thus, the quantizing noise is not negligible with regard to the dial tone and so on, and is heard as a single tone superimposed on the analog tone to be communicated. Although the level of the single tone is considerably low, it is offensive to the ears of the subscribers.

SUMMARY OF THE INVENTION

An object of the present invention is to provide a switching system including a tone trunk (TNT), in which the tone trunk stores, in its digital memory, a particularly processed digital tone signal which does not produce an offensive single tone caused by quantizing noise when converted into an analog tone signal.

To attain the above object, the digital memory of the tone trunk stores therein a digital tone signal which is particularly processed in such a way that the analog tone signal, converted from the digital tone signal, has a frequency spectrum in which a white noise is exhibited in an audio frequency range other than at the frequency or frequencies inherent to the related analog tone signal.

BRIEF DESCRIPTION OF THE DRAWINGS

The above object and the features of the present invention will be more apparent from the following description of the preferred embodiments with reference to the accompanying drawings wherein, wherein:

FIGS. 7A and 7B, related as shown in FIG. 7, are flow charts of successive steps for determination of the modified quantization level to obtain the modified digital codes according to the present invention;

FIGS. 12A and 12B, related as shown in FIG. 12, are flow charts of successive steps, according to the present invention, for generation of the digital codes, including the modified digital codes, to be stored in the digital memory;

FIGS. 14A and 14B, related as shown in FIG. 14 are flow charts of successive steps which are more practical embodiments of the steps of FIG. 12B.

DESCRIPTION OF THE PREFERRED EMBODIMENTS

Before describing the embodiments of the present invention, the problem of the prior art will be first described with reference to the related figures.

Figure 1:
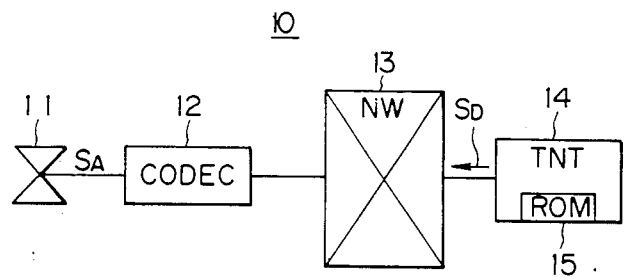
FIG. 1 is a general view of a known switching system.

FIG. 1 is a general view of a known switching system. In the switching system 10, the present invention particularly relates to a tone trunk 14 having a digital memory, preferably a read-only memory (ROM) 15. The tone trunk is provided by a network (NW) 13 and supplies a digital tone signal $S_D$ to a network (NW) 13. By way of the network, the digital tone is supplied to a coder-decoder (CODEC) 12 so that a required telephone set 11 of a subscriber receives an analog tone signal $S_A$.

The ROM 15 stores a variety of digital tone signals $S_D$, a desired one of which is read therefrom and converted into the analog tone signal $S_A$ by means of a decoder in the CODEC 12, to supply, for example, a dial tone (DT) signal to the telephone set 11.

Figure 2:
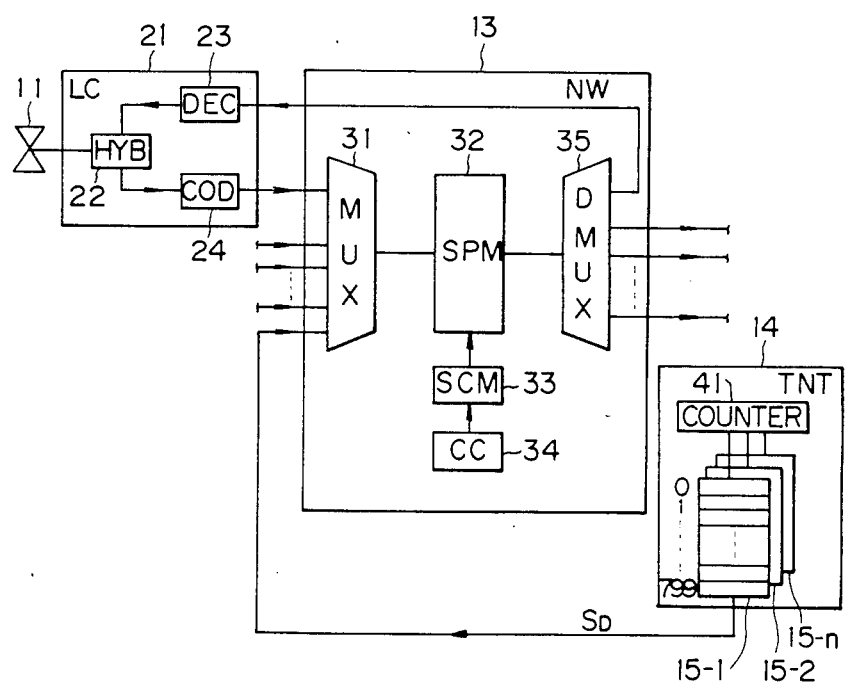
FIG. 2 is a more detailed general view of the switching system shown in FIG. 1.

FIG. 2 is a more detailed general view of the switching system shown in FIG. 1. Members identical to those of FIG. 1 are represented by the same reference numerals and characters. The telephone set 11 is connected with the network 13 via a line circuit (LC) 21, which is mainly comprised of the decoder (DEC) 23, the coder (COD) 24, both forming the CODEC 12, and a hybrid circuit (HYB) 22. An analog voice signal generated from the telephone set 11 is transmitted to a multiplexer (MUX) in the network 13 by way of the hydrid circuit 22 and the coder 24, which produces a digital voice signal. It should be understood here that many identical telephone sets (11) and the corresponding line circuits (21) are commonly connected with the multiplexer 13, but only one telephone set and also only one line circuit are illustrated herein for brevity. The thus multiplexed digital voice signals are assigned to respective time slots and fed to a speech path memory (SPM) 32 in which a desired switching operation of the multiplexed digital voice signals is achieved with the use of a speech path control memory (SCM) 33, which stores address data, under control of a central control equipment (CC) 34, so that the speech path control memory 33 produces the address for accessing the speech path memory 32 in order to establish a required switching. The thus-switched digital voice signals are distributed, by means of a demultiplexer (DMUX) 35, to the other side telephone set (similar to the telephone set 11) by way of the decoder (similar to the decoder 23) which converts the received digital voice signal into the analog voice signal to be actually heard with the telephone set.

The multiplexer 31 also multiplexes, together with the received digital voice signals, the digital tone signal $S_D$ which is given from the tone trunk 14. The tone trunk 14 has a plurality of the ROM's 15-1, 15-2, ..., 15-n. For example, the ROM's 15-1 and 15-2 exclusively store therein the digital dial tone (DT) signal and the ring-back tone (RBT) signal, respectively. Taking the ROM 15-1 as representative of these ROM's, the ROM 15-1 stores, for example, 800 words at respective addresses "0", "1" through "799". Each of the words is composed of, for example, an 8-bit digital code indicative of a quantization level representing each sampling analog dial tone (DT) signal. These 800 words express the analog dial tone signal for one period only thereof. Thus, a continual analog dial tone signal can be generated by sequentially reading the 800 words in the ROM 15-1 from the address "0" to "799" repeatedly. The sequential reading of the words is achieved with the use of a counter 41. The thus sequentially read words, i.e., the digital codes, are always and repeatedly given to the multiplexer 31 and fed to the speech path memory 32, using every time slot $TS_i$ assigned exclusively to the digital tone signal $S_D$ composed of the serial digital codes. If the analog dial tone signal is to be supplied to the telephone set 11, to which another time slot $TS_j$ is exclusively assigned, each digital dial tone signal of every time slot $TS_i$ is switched to exist in every time slot $TS_j$ so as to transfer the digital tone signal to the decoder 23 pertaining to the related telephone set 11. The digital tone signals from the other ROM's are also continually supplied, using respective time slots, to the multiplexers 31.

Figure 3:
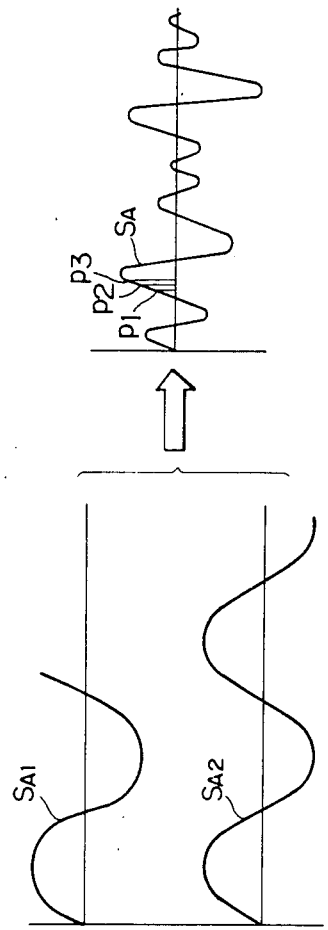
FIG. 3 depicts waveforms of analog tone signals.

FIG. 3 depicts waveforms of analog tone signals. The waveform at right side indicates the analog tone signal $S_A$ to be actually supplied to the telephone set. The analog tone signal $S_A$ is usually generated by mixing a plurality of sine wave analog signals, for example, first and second sine wave analog signals $S_{A1}$ and $S_{A2}$. Suppose that the signal $S_A$ indicates the analog dial tone (DT) signal according to the U.S. standard for a switching system, the first and second sine wave analog tone signals $S_{A1}$ and $S_{A2}$ have the frequencies of 350 Hz and 440 Hz, respectively. The analog tone signal $S_A$ is sampled at, for example, 8 kHz, in time series and each sampling analog tone signal level (refer to p1, p2, and p3 as examples) is expressed with the corresponding quantization level. Then each quantization level is transformed into the corresponding digital code. A series of these digital codes forms the digital tone signal $S_D$. If the quantization levels are transformed under the PCM coding rule, the quantization levels are classified, as known, into 0 through 127 levels in a positive sign side range and 0 through 127 levels in a negative sign side range. One of these quantization levels is selected for each given sampling analog tone signal, which selected quantization level is closest to the level of this given analog tone signal. In other words, there is only the smallest difference between the two levels.

As mentioned previously, the single tone due to the quantizing noise is offensive to the ear when the monotonous analog tone, such as the dial tone (DT) is given to the subscriber. This will be clarified with reference to FIG. 4.

Figure 4:
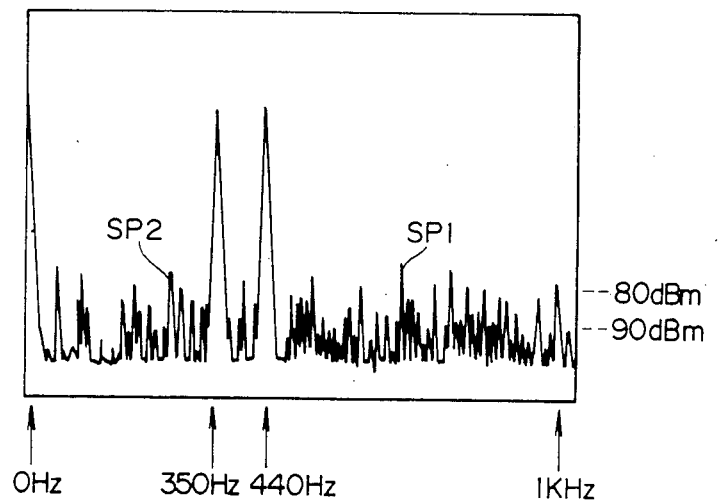
FIG. 4 is a graph of a frequency spectrum actually measured with the use of an analog tone decoded from the conventional digital codes.

FIG. 4 is a graph of a frequency spectrum actually measured with the use of an analog tone decoded from the conventional digital codes. The analog tone used for the measurement is the analog dial tone (DT) according to the aforesaid U.S. standard. Accordingly, two strong spectra are exhibited at the frequencies 350 Hz and 440 Hz. In the graph, attention should be paid to the fact that there are some spectrum peaks at frequencies other than the inherent frequencies 350 Hz and 440 Hz in the range between 0 Hz and 1 kHz, which peaks, such as SP1 and SP2, have relatively high spectrum levels within the audio frequency range. If the spectrum peak SP1 is strongest among the spectrum peaks, an offensive monotonous tone is heard as a tone of about 600 Hz.

The present invention is featured by the following fact. That is, under a conventional coding rule, each of the digital codes to be stored in the digital memory (refer to the ROM 15-1, 15-2, ..., 15-n) for the corresponding sampling analog tone signal is determined in such a manner that the predetermined quantization level is selected by a level closest to the level of the sampling analog tone signal to be coded, so that the thus determined digital code is given, in the form of the digital tone signal, to the decoder in the line circuit to feed the corresponding decoded analog tone signal to the subscriber. According to the present invention, the digital codes to be stored in the digital memory are composed of the usual digital codes, as mentioned above, and/or the modified digital codes. The modified digital codes are not determined through usual coding, but are determined such that either the usual or modified digital codes produce, when decoded into the corresponding analog tone signal, a quantizing noise in the form of a white noise. The thus produced white noise effectively hides the aforesaid peaks (shown by SP1 and SP2 in FIG. 4) of the spectrum which are offensive to the ear. This will be immediately comprehended, at a glance, with reference to FIG. 5.

Figure 5:
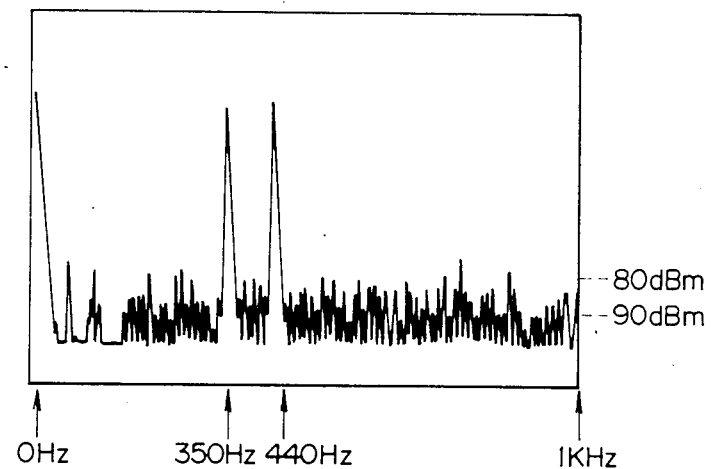
FIG. 5 is a graph of a frequency spectrum actually measured with the use of an analog tone decoded from digital codes composed according to the present invention.

FIG. 5 is a graph of a frequency spectrum actually measured with the use of an analog tone decoded from digital codes composed according to the present invention. In the example, an analog dial tone (DT) is used, as in the measurement for the spectrum of FIG. 4. As apparent from the graph of FIG. 5, the quantizing noise is formed as the white noise. The white noise is a random acoustic noise that has equal energy per cycle over a specified total frequency band. This creation of the white noise as the quantizing noise is a unique idea based on the present invention.

To be specific, the modified digital codes are determined such that the modified digital codes or the usual digital codes produce, when both digital codes are decoded into the analog tone signal, the quantizing noise having a lower frequency than that of the usual quantizing noise. In this case, the quantizing noise of a low frequency necessarily generates higher harmonics, compared to the fundamental frequency, which results in the generation of the intended white noise, as shown in the graph of FIG. 5.

To be more specific, the modified digital codes are determined as follows. When a sampling analog tone signal level is given, the corresponding digital code is created by coding a certain quantization level for the given sampling analog tone signal level, which quantization level is different from the usual quantization level therefor. This will be clarified with reference to FIG. 6.

Figure 6:
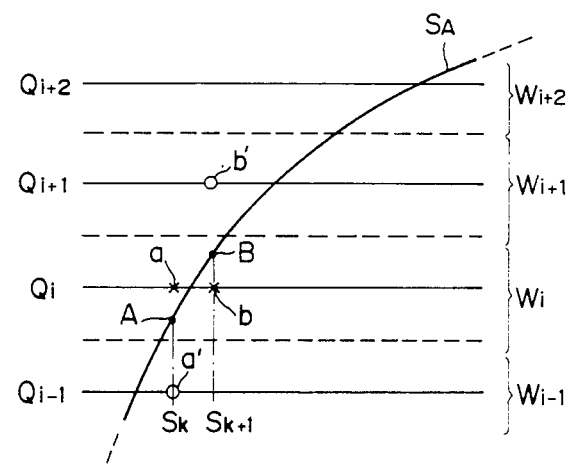
FIG. 6 is a level chart for explaining the modified digital code according to the present invention.

FIG. 6 is a level chart for explaining the modified digital code according to the present invention. In the level chart, a part of the analog tone signal $S_A$ shown in FIG. 3 is taken as an example and illustrated as a solid line curve. In order to obtain digital codes for the signal $S_A$, the signal $S_A$ is first sampled at sampling points, for example, $S_k$ and $S_{k+1}$. The sampling analog tone signal levels at the points $S_k$ and $S_{k+1}$ are A and B, respectively. The sampling levels A and B are quantized to obtain the corresponding quantization levels which are then transformed into respective digital codes. The quantization levels are denoted by lines $Q_i$, $Q_{i-1}$ and so on, and characters $W_i$, $W_{i+1}$ and so on denote the quantization width. Usually, a quantization level for the sampling level A is determined to be a quantization level "a". This is because, according to a usual coding rule, a quantization level located closest to the level A is the level "a". Similarly, a quantization level for the sampling level B is determined to be a quantization level "b". To the contrary, the modified digital codes according to the present invention are determined by using certain quantization levels different from the usually specified quantization levels, such as "a" and "b". That is, quantization levels "a'" and "b'" are selected for the sampling levels A and B, respectively. The rule for the selection of the levels "a'" and "b'" is as follows. If the usually specified quantization level "a", that is $Q_i$, is higher than the related sampling level A, the resultant quantization level which is lower than the level A, is selected so that the level "a'" is determined. Inversely, if the usually specified quantization level "b", that is $Q_i$, is lower than the related sampling level B, the resultant quantization level which is higher than the level B is selected, so that the level "b'" is determined. It should be noted here that such modified quantization levels, i.e., "a'" and "b'", are not used for all the sampling analog tone signal levels A, B and so on, but selectively used in such a manner that the low frequency quantizing noise is generated.

Figure 7B:
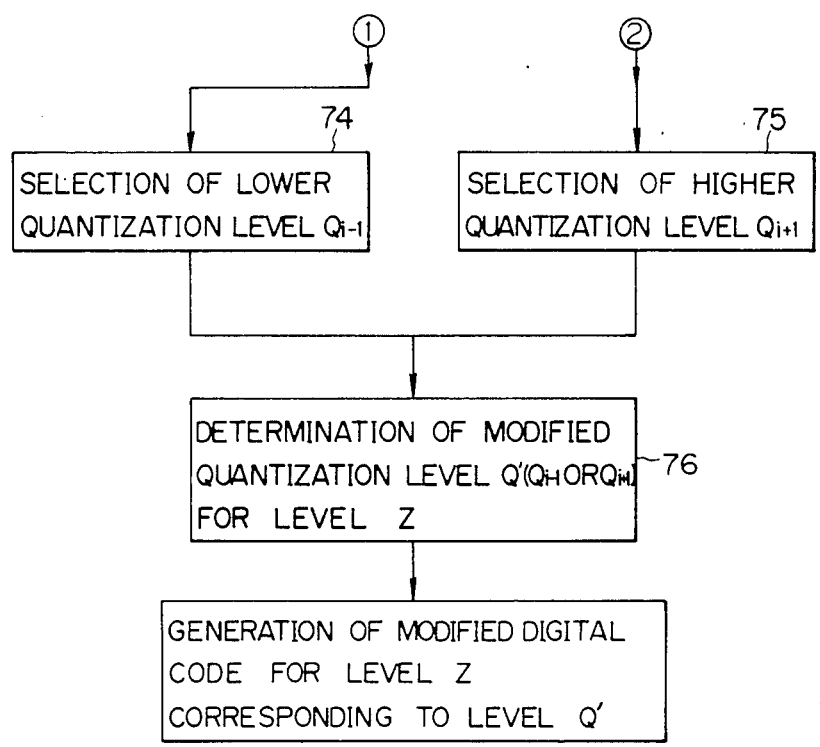

FIGS. 7A and 7B are flow charts of successive steps for determination of the modified quantization level to obtain the modified digital codes according to the present invention. In step 71, an analog tone signal level Z is supplied by sampling a given analog tone signal to be coded. In step 72, usual quantization level $Q_i$ (refer to "a" and "b" in FIG. 6) for the level Z is determined according to the usual coding rule. In step 73, whether or not the level $Q_i$ is higher than Z is determined. If the result is "YES", step 74 starts, and if the result is "NO", step 75 starts. In step 74, the lower quantization level $Q_{i-1}$ (refer to "a'" in FIG. 6) is selected, and in step 75, the higher quantization level $Q_{i+1}$ (refer to "b'" in FIG. 6) is selected. The thus selected level $Q_{i-1}$ or $Q_{i+1}$ is determined, in step 76, as the modified quantization level Q' for the sampling level Z. Then the modified digital code for the level Z, corresponds to the modified quantization level Q'. The modified digital codes are sequentially produced for each sampling analog tone signal level and can be stored in the digital memory (ROM) of the tone trunk 14. The reason why the thus stored modified digital codes are useful for shifting the frequency of the quantizing noise lower and thus producing the white noise, will be clarified hereinafter.

Figure 8:
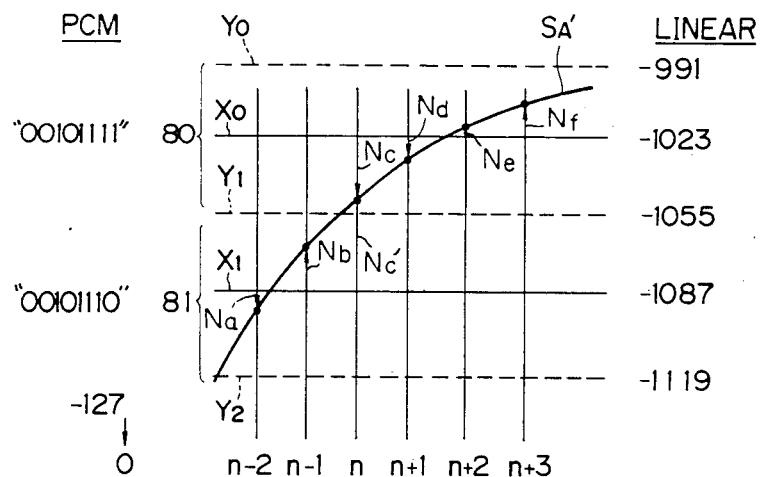
FIG. 8 is a graph for explaining a sampling of an analog tone signal to be coded.
Figure 9:
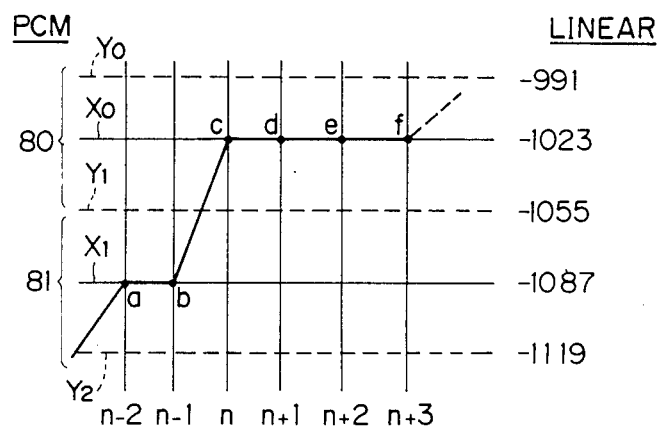
FIG. 9 is a graph for explaining a digital coding of the levels sampled according to the process shown in FIG. 8.
Figure 10:
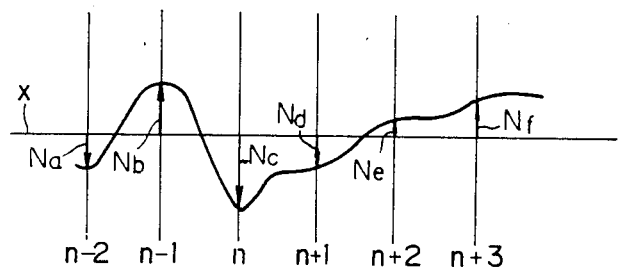
FIG. 10 is a graph for explaining a variation of the quantizing noise.
Figure 11:
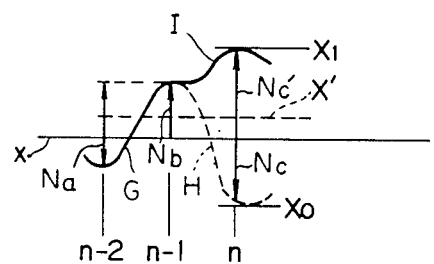
FIG. 11 is a graph for the modified quantizing noise which features, the present invention.

Another example for realizing the present invention will be mentioned below. FIG. 8 is a graph for explaining a sampling of an analog tone signal to be coded. FIG. 9 is a graph for explaining a digital coding of the levels sampled according to the process shown in FIG. 8. FIG. 10 is a graph for explaining a variation of the quantizing noise. FIG. 11 is a graph for the modified quantizing noise which features the present invention. In FIG. 8, a curve $SA'$ represents an analog tone signal to be coded. The analog tone signal $S_A'$ is a mixture of, for example, a first sine wave signal and a second sine wave signal. The first sine wave signal has a frequency F1, a level L1 for frequency F1 level and a phase P1, and the second sine wave signal has similar parameters F2, L2 and P1. These parameters are not used here, but are used later. The analog tone signal $S_A'$ is coded in the form of, for example 8-bit digital codes as the PCM code. The PCM digital codes are classified, as mentioned previously, into levels 0 through 127 in the positive sign side range and also levels 0 through 127 in the negative sign side range. The PCM digital code of level 127 is decoded in the decoder 23 (FIG. 2) as a linear analog level 0 (refer to Table II recited hereinafter), and the PCM digital code of level 0 is decoded therein as a linear analog level 8031 (Table II). In the example of FIG. 8, two PCM digital codes of levels 80 and 81 are shown which are equivalently expressed as "00101111" and "00101110", respectively, in terms of a binary code. The analog tone signal having the linear levels −991 through −1055 corresponds to the PCM digital code of level 80 and similarly the analog tone signal having the linear levels −1055 through −1119 corresponds to the PCM digital code of level 81. However, when the PCM digital code of level 80 is decoded in the decoder 23 to be the linear level of −1023 and when the PCM digital code of level 81 is decoded therein to be −1087.

The analog tone signal $S_A'$ (FIG. 8) to be coded is sampled with a constant sampling period, such as n−2, n−1, n, ... (refer to $S_k$, $S_{k+1}$ in FIG. 6). The sampling analog tone signal levels are represented by characters "a", "b", "c", "d", "e", and "f". Characters $X_0$ and $X_1$ represent center levels for the PCM coding (refer to $Q_i$, $Q_{i-1}$, $Q_{i+1}$ in FIG. 6). Characters $Y_0$, $Y_1$ and $Y_1$, $Y_2$ represent coding ranges for the center levels $X_0$ and $X_1$, respectively (refer to the quantization width $W_i$, $W_{i-1}$, $W_{i+1}$ in FIG. 6).

The relationship between the PCM digital codes and the linear levels for each sampling analog tone signl level (Na, Nb, ..., Nf of FIG. 8) is clarified with reference to FIG. 9. The sampling analog tone signal levels "a" and "b" (Na and Nb of FIG. 8) are transformed into the PCM digital code of level 81. The sampling analog tone signal levels "c", "d", "e", and "f" are transformed into the PCM digital code of level 80. The PCM digital codes of levels 81 and 80 are decoded in the decoder 23 (FIG. 2) and become the linear levels of −1087 and −1023, respectively. Thus, the change in waveform from the curve of FIG. 8 to the curve FIG. 9 necessarily produces the quantizing noise having the waveform of FIG. 10. In other words, the differences Na, Nb through Nf with respect to the center levels $X_0$ and $X_1$ cause the quantizing noise of FIG. 10 having the frequency defined by the change of the differences (Na, Nb, ..., Nf) in time series.

The essential point of the present invention is well understood from FIG. 11. The quantizing noise curve of FIG. 11 is a part of the curve of FIG. 10. In FIG. 11, the inherent quantizing noise is defined by the solid line curve G and the broken line curve H, as illustrated in FIG. 10. However, the inherent quantizing noise curve (H) is transformed into a modified quantizing noise curve which is defined by the solid curve I. The modification of the quantizing noise curve (G+H) is performed by selecting, at the sampling point n, not the usual noise level Nc but the modified noise level Nc'. The selection of Nc', instead of Nc, has already been explained with reference to FIG. 6. Thus the modified PCM digital code is obtained by particularly using the quantization level $X_1$ in FIG. 8 for the sampling analog tone signal $S_A'$ at the sampling point n. Refering further to FIG. 11, the modified quantizing noise (G+I) is lower in frequency than that of the inherent quantizing noise (G+H). In this case, as previously mentioned, the quantizing noise of a low frequency necessarily generates higher harmonics, which results in the generation of the intended white noise.

The above-mentioned shift in frequency of the quantizing noise into a low frequency can be attained by selecting the quantization levels so as to produce the related quantizing noise having a waveform substantially identical to the waveform inherent quantizing noise obtained through a low-pass filter (LPF).

The above-mentioned low frequency quantizing noise can be practically obtained by selecting each quantizing level for each sampling analog tone signal level with the use of a prediction means having a characteristic of a low-pass filter. The prediction predicts the quantizing noise level with the use of at least two preceding quantizing noise levels in accordance with the characteristic of the low-pass filter. Assuming that the two predicted preceding quantizing noise levels are P(n−2) and P(n−1), the next expected quantizing noise level P(n) is predicted by using the two noise levels P(n−2) and p(n−1) so as to conform with the characteristic of the low-pass filter. Then the actual quantizing level at the sampling point n, is determined to be a quantizing level which is closest to the predicted quantizing level P(n).

The above-mentioned prediction according to the low-pass filter is performed most simply under the equation $$P(n) = \frac{P(n-2) + P(n-1)}{2}.$$

Taking the curve of FIG. 11 as an example, when the preceding predicted quantizing noise levels P(n−2) and P(n−1) assume the levels Na and Nb, respectively, the next quantizing noise level P(n) is predicted as $$P(n) = \frac{Na + Nb}{2},$$

which is the level indicated by the broken line X' in FIG. 11. Then, the actual quantizing level, at the sampling point n, is determined to be that which is closest to the predicted level X', which is equivalent to a case, in FIG. 8, where the larger level difference, i.e., Nc', is used instead of the smaller level difference, i.e., Nc, which would have been used under the usual coding rule.

The above-mentioned prediction can be performed, in general, by using a known transversal filter, i.e., a transversal type low-pass filter. The transversal type low-pass filter operates to predict the quantizing noise level P(n) by the equation $$P(n) = \sum_i T_i \cdot P(n - i),$$

where $T_i$ denotes a filter coefficient.

Figure 12B:
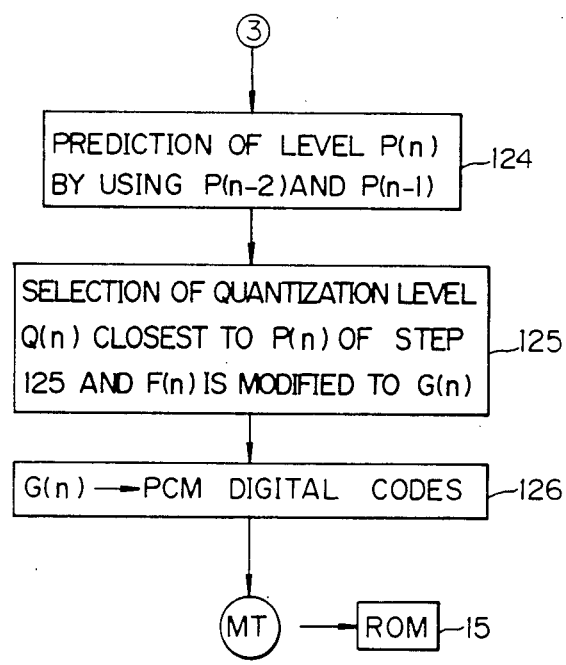

FIGS. 12A and 12B are flow charts of successive steps, according to the present invention, for the generation of the digital codes including the modified digital codes to be stored in the digital memory. It should be understood that the example concerned is based on the modification performed in FIG. 11. In the example, the analog tone signal $S_A'$ of FIG. 8 is coded, and is a mixture of the first sine wave signal (F1, L1, P1) and the second sine wave signal (F2, L2, P2). In step 121, the variety of data needed for creating the signal $S_A'$ are prepared, for example, the frequencies, e.g., F1 at 350 Hz, F2 at 440 Hz, the prescribed levels L1 (dB) and L2 (dB) for the frequencies F1, F2, and the phases P1, P2 which may be arbitrarily determined to be, for example, zero.

In step 122, a variety of the prescribed PCM data concerned are prepared. A part of the prescribed PCM digital codes, according to the known μ-law, is shown in Table I below.

TABLE I

| ANALOG SIGNAL LEVEL ($S_A'$) | PCM CODE |
| --- | --- |
| 7903~8159 | 10000000 |
| 7647~7903 | 10000001 |
| 7391~7647 | 10000010 |
| 7135~7391 | 10000011 |
| ⋮ | ⋮ |
| 3~5 | 11111101 |
| 1~3 | 11111110 |
| 0~1 | 11111111 |
| 0~−1 | 01111111 |
| −1~−3 | 01111110 |
| ⋮ | ⋮ |

A part of the linear levels to be decoded in the decoder 24 (FIG. 2) is shown in Table II below.

TABLE II

| INPUT LEVEL OF DECODER 14 IN DECIMAL EXPRESSION | | | LINEAR LEVEL |
|---|---|---|---|
| 8159 ⎫ | ... | ... | 8031 |
| 7903 ⎪ | ... | ... | 7775 |
| 7647 ⎬ | ... | ... | 7519 |
| 7391 ⎪ | ... | ... | 7263 |
| 7135 ⎭ | | | |
| . | | | . |
| . | | | . |
| . | | | . |
| 3 ⎫ | ... | ... | 2 |
| 1 ⎭ | | | |
| 0 | | | 0 |
| −1 ⎫ | ... | ... | −2 |
| −3 ⎭ | | | |
| . | | | . |
| . | | | . |
| . | | | . |

According to the prior art method, it is not necessary to use the data of the above Table II, however, in the present invention, the data concerned are needed for the calculation of the quantizing noise levels (refer to Na through Nf in FIG. 10), which will be achieved later in step 124.

In step 123, the amplitudes at each sampling point for the analog tone signal $S_A'$ are calculated based on an equation F(n), which amplitudes are similar to the levels p1, p2, and so on in FIG. 3. The equation F(n) is expressed as follows.

$$F(n) = A1 \cdot \sin(2\pi F1 \cdot n \cdot t + P1) + A2 \cdot \sin(2\pi F2 \cdot n \cdot t + P2)$$

Where, characters A1 and A2 are defined by $$A1 = 8031 \cdot 10^{\frac{L1}{20}} \text{ and } A2 = 8031 \cdot 10^{\frac{L2}{10}},$$

t denotes a sampling period, for example, 1/8000 under an 8 kHz sampling rate, and n sampling points, for example, n=0, 1, 2, ..., 799 when the previously mentioned 800 words are to be stored in the digital memory 15.

In step 124, each quantizing noise level P(n) is predicted by using at least two preceding quantizing noise levels P(n−2) and P(n−1) according to a characteristic of a low-pass filter. Practically, as mentioned previously, P(n) is simply predicted by the expression $$\frac{P(n-2) + P(n-1)}{2},$$

where P(−2) and P(−1) are zero.

In step 125, a quantization level Q(n) at the sampling point n is determined, which level Q(n) is closest to the predicted quantizing noise level P(n). This means that, in FIG. 11, the noise level c is not used, as usual, but the noise level c' is used instead. Then the sampling analog tone signal level F(n) is modified to G(n) which corresponds to the quantization level Q(n).

In step 126, the modified sampling analog tone signal level G(n) is transformed into the corresponding PCM digital code. Then, the thus transformed PCM digital codes are once loaded in a magnetic tape (MT) and supplied to the digital memory (ROM) 15.

Figure 13:
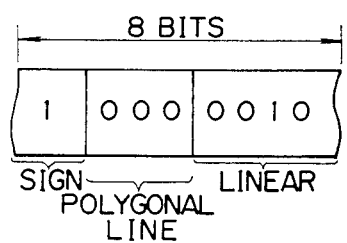
FIG. 13 is an example of a data format of the PCM digital code.

FIG. 13 is an example of a data format of the PCM digital code. The PCM digital code represents, as an example, the sampling analog tone signal level allotted to the range 7391 through 7647 reciated in the Table I.

Figure 14B:
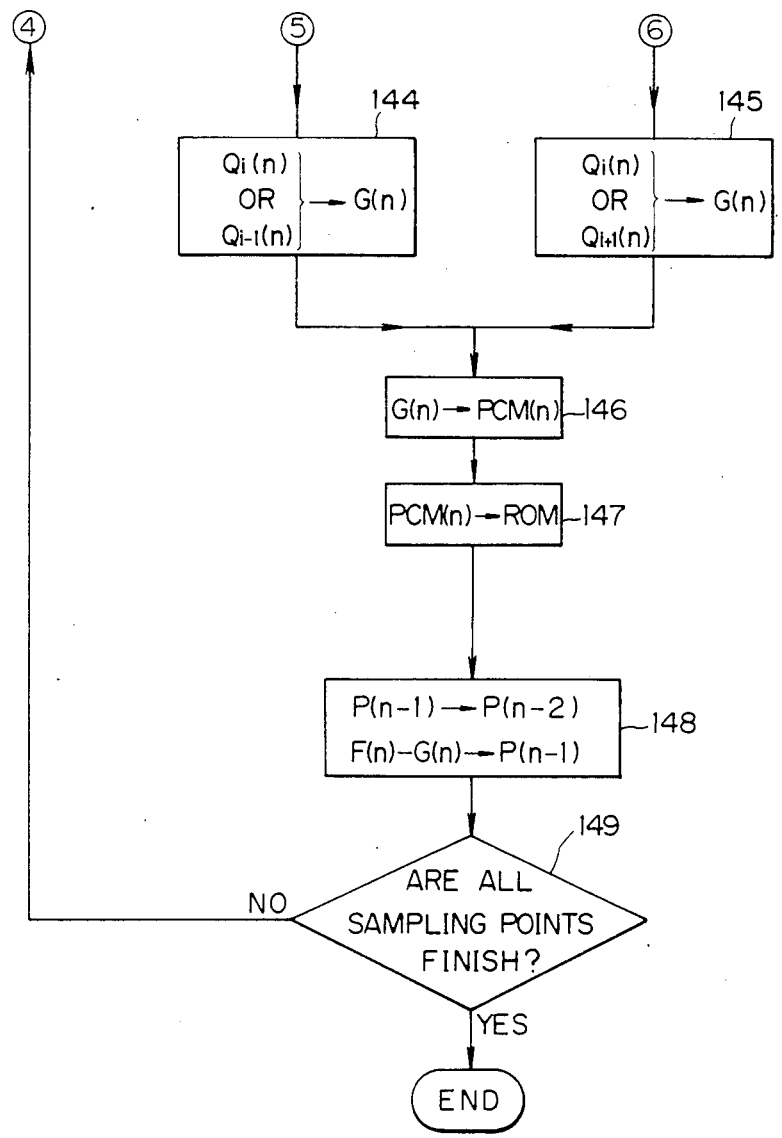

FIGS. 14A and 14B are flow charts of successive steps which are more practical embodiments of the steps of FIG. 12B.

In step 141 of FIG. 14A, the quantization level $Q_i(n)$ closest to the sampling analog tone signal level F(n) is selected. The characters $Q_i(n)$ represent the level $Q_i$ (refer to FIG. 6) at the sampling point n.

In step 142, the quantizing noise level P(n), at the sampling point n, is predicted, using preceding levels P(n−i) through P(n−1), under the aforesaid equation $$\sum_i T_i P(n - i) = P(n)$$

which represents the characteristic of the transversal type low-pass filter.

In step 143, whether or not the sign of $(Q_i(n) - P(n))$ is positive is determined.

In step 144 of FIG. 14B, if the result of step 143 is "YES", a modified or nonmodified quantization level G(n) is determined, which G(n) is equal to either $Q_i(n)$ or $Q_{i-1}(n)$ (corresponding to $Q_i$ or $Q_{i-1}$ in FIG. 6), being closer to the predicted level P(n).

In step 145 of FIG. 14B, if the result of step 143 is "NO", a modified or nonmodified quantization level G(n) is determined, which G(n) is equal to either $Q_i(n)$ or $Q_{i+1}(n)$, being closer to the predicted level P(n).

In step 146, the thus determined G(n), as for $Q_{i-1}$ or $Q_i$ or $Q_{i+1}$, is transformed into the corresponding PCM digital code PCM (n).

In step 147, the PCM digital code PCM(n) is stored in the digital memory (ROM) 15, via a suitable buffer, such as the magnetic tape MT.

In step 148, the previous P(n−2) is replaced with the previous P(n−1). Further, the difference between F(n), i.e., original sampling analog tone signal level, and G(n), i.e., determined in step 144 or 145, is used as a new preceding level P(n−1).

In step 149, if all of the sampling points, for example, 800 points, are not yet processed ("NO"), the next PCM coding operation starts again from step 141. If the result is "YES", the digital memory 15 is fulfilled with the PCM digital codes for the corresponding analog tone which will be heard at the subscribers telephone without a single tone offensive to the ears.

As mentioned above in detail, according to the present invention, a high quality switching system is realized in view of the tone trunk (TNT), since the digital memory thereof contains digital codes therein which do not produce, when converted into the corresponding analog tone signal, a single tone offensive to the ear.

We claim:

1. A switching system comprising:
   a plurality of telephone sets for each subscriber;
   a network which is operative to achieve a switching operation of digital signals to be communicated between the plurality of telephone sets by way of respective line circuits having a coder and decoder; and
   a tone trunk which is operative to store, in a digital memory thereof, at least one predetermined digital tone signal, in the form of digital codes, for supplying, by way of the network and said decoder, the corresponding analog tone signal to the telephone sets, in which the digital codes are coded in such a way that the decoded analog tone signal is accompanied by a quantizing noise, created during a conversion from the analog tone signal to the digital tone signal, which quantizing noise is substantially the same as a white noise.

2. A system as set forth in claim 1, wherein said digital codes are composed of usual digital codes and/or modified digital codes, in which each of the usual digital codes is determined by allotting a quantization level which produces a lowest quantizing noise level, while each of the modified digital codes is determined by allotting a quantization level which produces a quantizing noise level which is higher than the lowest quantizing noise level, i.e., next higher quantizing noise level.

3. A system as set forth in claim 2, wherein, regarding said modified digital codes, respective said next higher quantizing noise levels are selected such that the related analog tone signal is accompanied by a quantizing noise, the fundamental frequency of which is low, so that the higher harmonics of the quantizing noise results in said white noise.

4. A system as set forth in claim 3, wherein each of said modified digital codes for respective sampling analog tone signal levels to be coded, which is analogous to the sampling levels of said analog tone signal, is determined to conform with a characteristic of a low-pass filter which is applied to the preceding quantizing noise levels at each preceding sampling point.

5. A system as set forth in claim 4, wherein each of the digital codes corresponding to respective said sampling analog tone signal levels, is determined according to a prediction of the quantizing noise level $P(n)$, at the sampling point n, along with the characteristic of said low-pass filter, with the use of at least two preceding quantizing noise levels $P(n-2)$ and $P(n-1)$, and a quantization level is allotted to the digital code at the sampling point n, which allotted quantization level is closest to the thus predicted quantizing noise level $P(n)$.

6. A system as set forth in claim 5, wherein said prediction is performed by means of a transversal type low-pass filter.

7. A method for generating digital codes to be stored in a digital memory of a tone trunk in a switching system having a network, the digital codes are supplied, by way of the network, in the form of a digital tone signal to telephone sets of subscribers pertaining to the switching system, after a conversion to the corresponding analog tone signal, and the digital codes are composed of usual digital codes and/or modified digital codes, each of which modified digital codes is generated by the steps of:

(a) supplying a sampling analog tone signal level, which analog tone signal is analogous to said analog tone signal to be supplied to the subscribers;

(b) determining a usual quantization level $Q_i$ for the sampling analog tone signal level Z;

(c) determining whether the level $Q_i$ is higher than the level Z;

(d-1) selecting a lower quantization level $Q_{i-1}$, if the result of step (c) is "$Q_i > Z$";

(d-2) selecting a higher quantization level $Q_{i+1}$, if the result of step (c) is "$Q_i < Z$";

(e) determining the modified quantization level as being either $Q_{i-1}$ or $Q_{i+1}$ for the level Z;

(f) generating the modified digital code corresponding to the modified quantization level determined in step (e);

(g) repeating the above-recited steps (a) through (f) for the next supplied sampling analog tone signal level.

8. A method for generating digital codes to be stored in a digital memory of a tone trunk in a switching system having a network, the digital codes are supplied, in the form of a digital tone signal, to telephone sets of subscribers pertaining to the switching system, by way of the network, after a conversion to the corresponding analog tone signal, which method comprises the steps of:

(a) supplying each sampling analog tone signal level $F(n)$, which analog tone signal is analogous to said analog tone signal to be supplied to the subscribers;

(b) selecting a corresponding quantization level $Q_i(n)$, at a sampling point n, which level $Q_i(n)$ is closest to the level $F(n)$;

(c) predicting a corresponding quantizing noise level $P(n)$, at the sampling point n, using at least two preceding quantizing noise levels $P(n-2)$ and $P(n-1)$, at the preceding sampling points $(n-2)$ and $(N-1)$, according to the characteristic of a transversal type low-pass filter;

(d) obtaining a sign derived from a subtraction between $Q_i(n)$ and $P(n)$, i.e., $Q_i(n) - P(n)$;

(e-1) producing another quantization level $G(n)$, if the sign is positive, which level $G(n)$ is equal to either the level $Q_i(n)$ or the lower side level $Q_{i-1}(n)$, being closer to the predicted level $P(n)$ in step (c);

(e-2) producing another quantization level $G(n)$, if the sign is negative, which level $G(n)$ is equal to either the level $Q_i(n)$ or the higher side level $Q_{i+1}(n)$, being closer to the predicted level $P(n)$ in step (c);

(f) generating the digital code, at the sampling point n, corresponding to the level $G(n)$ given from either step (e-1) or step (e-2), and storing the same in said digital memory;

(g) replacing the previous level $P(n-2)$ with the previous level $P(n-1)$ and also replacing the previous $P(n-1)$ with a newly obtained subtraction value $F(n) - G(n)$;

(h) repeating the above-recited steps (a) through (g) with respect to the next supplied sampling analog tone signal level, until a supply of all of the sampling analog tone signal levels is finished.

* * * * *

UNITED STATES PATENT AND TRADEMARK OFFICE
CERTIFICATE OF CORRECTION

PATENT NO. :  4,680,758

DATED :  July 14, 1987

INVENTOR(S) :  KUMAZAKI ET AL.

It is certified that error appears in the above-identified patent and that said Letters Patent is hereby corrected as shown below:

Column 12, line 35, "(N-1)," should be --(n-1),--.

Signed and Sealed this

Twelfth Day of January, 1988

*Attest:*

DONALD J. QUIGG

*Attesting Officer*  *Commissioner of Patents and Trademarks*